United States Patent
Malik et al.

(10) Patent No.: US 7,856,453 B2
(45) Date of Patent: Dec. 21, 2010

(54) METHOD AND APPARATUS FOR TRACKING FUNCTIONAL STATES OF A WEB-SITE AND REPORTING RESULTS TO WEB DEVELOPERS

(75) Inventors: Masroor Malik, Union City, CA (US); Naveen Venkata Akunuri, Sunnyvale, CA (US); Christoph Kern, San Francisco, CA (US); Tim Armandpour, Redwood City, CA (US); Sam Khavari, Redwood City, CA (US); Ganesh Narasimhan, Sunnyvale, CA (US)

(73) Assignee: Yodlee.com, Inc., Redwood City, CA (US)

( * ) Notice: Subject to any disclaimer, the term of this patent is extended or adjusted under 35 U.S.C. 154(b) by 0 days.

(21) Appl. No.: 12/491,551

(22) Filed: Jun. 25, 2009

(65) Prior Publication Data
US 2009/0265774 A1 Oct. 22, 2009

Related U.S. Application Data

(63) Continuation of application No. 11/023,876, filed on Dec. 27, 2004, now Pat. No. 7,558,795, which is a continuation of application No. 09/639,346, filed on Aug. 15, 2000, now Pat. No. 6,842,782, which is a continuation-in-part of application No. 09/573,699, filed on May 19, 2000, now abandoned, which is a continuation-in-part of application No. 09/208,740, filed on Dec. 8, 1998, now Pat. No. 6,412,073.

(51) Int. Cl.
G06F 17/30 (2006.01)
(52) U.S. Cl. .................................................... 707/792
(58) Field of Classification Search ................. 707/204; 709/224; 705/42
See application file for complete search history.

(56) References Cited

U.S. PATENT DOCUMENTS

| | | | |
|---|---|---|---|
| 6,412,073 B1 * | 6/2002 | Rangan | 726/5 |
| 6,473,794 B1 * | 10/2002 | Guheen et al. | 709/223 |
| 6,721,713 B1 * | 4/2004 | Guheen et al. | 705/1 |
| 7,124,101 B1 * | 10/2006 | Mikurak | 705/35 |
| 2004/0064351 A1 * | 4/2004 | Mikurak | 705/7 |
| 2004/0107125 A1 * | 6/2004 | Guheen et al. | 705/7 |

* cited by examiner

Primary Examiner—Diane Mizrahi
(74) Attorney, Agent, or Firm—Donald R. Boys; Central Coast Patent Agency, Inc.

(57) ABSTRACT

A software tool for enabling automated tracking of activity related to the status and usage statistics of a plurality of Web sites on a data packet network is provided. The software tool comprises a network communication capability for establishing network communication between the software tool and the tracked Web sites; a plurality of data-reporting modules for obtaining and reporting data about tracked Web sites; a data input function for excepting data from the reporting modules and from external sources; a data recording function for recording and logging the data received from the reporting modules and from the external sources; and a data management function for organizing and storing the received data and rendering the data accessible for use in software development. A software engineer or developer accesses the site-tracking software and connected database through a Web browser from a network-connected workstation in order to utilize data mined from Web sites for the purpose of creating routines enabling automated navigation and site manipulation by proxy for subscribed users.

6 Claims, 10 Drawing Sheets

*Fig. 4 (Cobrand Architecture)*

METHOD AND APPARATUS FOR TRACKING FUNCTIONAL STATES OF A WEB-SITE AND REPORTING RESULTS TO WEB DEVELOPERS

CROSS-REFERENCE TO RELATED DOCUMENTS

The present invention is a continuation of U.S. patent application Ser. No. 11/023,876 filed on Dec. 27, 2004, which is a continuation of U.S. patent application Ser. No. 09/639,346 filed on Aug. 15, 2000 and issued as U.S. Pat. No. 6,842,782 on Jan. 11, 2005, which is a continuation-in-part (CIP) to a U.S. patent application Ser. No. 09/573,699 entitled "Method and Apparatus for Cobranding Portal Services and Normalizing Advertisements Delivered to Cobrand Subscribers", Filed on May 19, 2000, which is a CIP to a U.S. patent application Ser. No. 09/208,740 entitled "Method and Apparatus for Providing and Maintaining a User-Interactive Portal System Accessible Via Internet or Other Switched-Packet-Network", Filed on Dec. 8, 1998, issued as U.S. Pat. No. 6,412,073 on Jun. 25, 2002, disclosures of which are incorporated herein in their entirety by reference.

FIELD OF THE INVENTION

The present invention is in the field of Internet navigation and data communication, and pertains more particularly to methods and apparatus for tracking Web sites, their error rates and their status and reporting the information back to Web-site engineers.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A system known to the inventor and described in the cross-reference section above provides an interactive Internet portal that enables users to store their WEB pages, user names, passwords, and a system that performs pre-defined tasks such as navigation and interaction between WEB servers based on user pre-programming (user profiles). Such a system greatly simplifies on-line or network-based business transactions.

It is known in the art that certain providers of Web services often work with partners representing other companies offering similar services. These partnerships are termed cobrand partnerships in the art.

An example of a cobrand relationship would be that of a company A offering services through a company B to subscribers of company B as if the added services were provided and maintained by company B, but in reality are provided by company A. In a typical case of cobranding, subscribers to the cobrand partner are not aware that the added services are actually provided by a company other than the cobrand partner, or in this case, company A.

A problem with cobranding services in prior art involves the amount of cooperation, engineering, configuration, and so on that must be performed by both the service-providing company and the cobrand partner. For example, knowledge workers from both companies must interface and cooperate in order to provide a functional interface and mechanism for subscribers of the cobrand partner to utilize in order to receive the extra value-added services.

A software utility is known to the inventor for creating and configuring a cobrand service package. Such a utility is taught in the co-related application entitled "Method and Apparatus for Cobranding Portal Services and Normalizing Advertisements Delivered to Cobrand Subscriber", listed in the cross-reference section. This software utility comprises a function for installation and execution of the utility, a function for importing external data for use in the utility, a function for browsing and selecting functional services offered from within the utility, a function for constructing information pages, the information pages containing the imported external data and hyperlinks to the selected functional services, and a function for saving and submitting a configured utility to an entity for installation. The software utility is a self-contained utility, which upon completion functions as a service installation template for installing a cobrand service. By using the utility described above cobranded services may be efficiently implemented at Web-sites allowing added interaction capability and other services to existing Web-sites.

In addition to cobrand relationships, there exists on the Internet many popular service sites maintained by service-providing companies that are patronized by many users, thus indicating a wide popularity among users. Providing access to such popular Web locations and their services without requiring a user to physically navigate to the location is one of the primary goals of the inventor and is realized through a novel navigation sub-system that may be executed on behalf of a user according to user request. The navigation system executes according to machine-readable scripting, which provides such functionality as auto-log-in, automated form filling and submission, data gathering and summarization, navigation to secondary sites linked to a main site, and so on.

In order to provide such services through the portal system taught in disclosure included herein and referenced under the cross-reference section, an agreement must be forged between the company hosting the portal service and the company hosting a popular service site. Such an agreement, while not specifically a cobrand agreement, allows subscribers of portal services to access services of a popular site without being required to physically navigate to the site.

In order to implement proxy service access to popular Web locations, information is required from the particular location being added. Likewise, continuing information updates must be obtained from added sites in order that error-free access may be maintained over time. Such information may include data pertaining to the structure of a site, content of a site, site address, any added media functions to a site, and so on. Keeping apprised of current and up-to-date site revisions or changes presents a challenge to Web developers charged with implementing and maintaining proxy service-access to such sites, especially so, when there are many added sites.

One way to handle site revisions and other site changes is to allow Web-developers associated with a proxy service sole authorization to revise, add to, or otherwise alter a site. This may be practiced to insure that no changes are added which conflict with written scripts for accessing services, or at least without new scripts being written or old ones being revised to accommodate the site changes. However, this solution is an impractical one for a variety of reasons. One is that Web-developers specifically charged with maintaining popular sites are not likely to cooperate with those from a proxy service as they know best what their respective companies wish to do with a particular site in terms of construction and alteration. Allowing entities from an outside company to be the sole facilitators of a particular site, even with instruction provided by developers specific to the site in question is generally not desired, even in exchange for sending clients to their services by proxy.

An alternative requires that Web-developers working to provide proxy services for a particular site continually monitor the site for additions, revisions, address changes, structure changes, and so on to insure that proxy services may continue on an ongoing basis in an un-interrupted fashion. One with skill in the art will recognize that if a developer is charged with maintaining proxy services to many sites, he or she may be considerably back-logged with tasks that are overdue. In the interim, proxy services to particular sites may be delayed for long periods.

What is clearly needed is a method and apparatus that allows automated site tracking and reporting back to Web-developers such that they may function in a more efficient and streamlined fashion.

SUMMARY OF THE INVENTION

In a preferred embodiment of the present invention a software tool for enabling automated tracking of activity related to the status and usage statistics of a plurality of Web sites on a data packet network is provided. The software tool comprises, a network communication capability for establishing network communication between the software tool and the tracked Web sites; a plurality of data-reporting modules for obtaining and reporting data about tracked Web sites; a data input function for excepting data from the reporting modules and from external sources; a data recording function for recording and logging the data received from the reporting modules and from the external sources; and a data management function for organizing and storing the received data and rendering the data accessible for use in software development.

In a preferred embodiment, the data packet network is the Internet network. In this aspect, the software tool is an Internet-based application executing and running on an Internet server. In all aspects, the software tool is accessible through a network-browser application. The plurality of data-reporting modules are characterized by the types of data reported by each module. In one aspect, the network communication capability is established through hyperlinking to distributed data reporting modules embedded within the tracked sites.

In all aspects of the present invention, the external data sources include at least a software engineer. Web sites are mined for data for the purpose of enabling the software engineer to generate software scripts designed to provide automated access to functional services based on data results. In preferred applications, the software tool further comprises a module for notifying the software engineer any changes or updates to individual ones of the tracked Web sites. Also in preferred applications, the software tool further comprises a module for testing software routines written by the software engineer concerning individual ones of the tracked Web sites.

In another aspect of the present invention, a system for enabling automated tracking of activity related to the status and usage statistics of a plurality of Web sites on a data packet network is provided. The system comprises: a site-tracking server connected to the network and adapted for communication with other servers connected to the network; a site-tracking software application residing in the site-tracking server, the site tracking software comprising a network communication capability, a plurality of data-reporting modules, a data input function, a data recording function, and a data management function for organizing and storing data; a data repository accessible to the site-tracking server for storing data and a computerized workstation connected to the network for enabling access to the site tracking software, the data repository, and the site-tracking server.

In a preferred embodiment the system is implemented on the Internet network. In one embodiment, network communication capability between servers is established through hyperlinking to distributed data-reporting modules embedded within the tracked Web sites. In a preferred embodiment, the site-tracking software is accessible through a network-browser application installed on the computerized workstation manned by a software engineer. In all aspects, the Web sites are mined for data for the purpose of enabling the software engineer to generate software scripts designed to provide access to functional services based on data results. The system further comprises a module in the site-tracking software for notifying the software engineer of any changes or updates to individual ones of the tracked Web sites. In the same aspect, a module is provided in the site-tracking software for testing software routines written by the software engineer concerning individual ones of the tracked Web sites.

In yet another aspect of the present invention, a method for enabling automated tracking of activity related to the status and usage statistics of a plurality of Web sites on a data packet network is provided. The method includes the steps of (a) mining data from individual ones of tracked Web sites; (b) receiving data from the Web sites through network communication with the data reporting modules by virtue of a site-tracking software application; (c) organizing and sorting the received data according to site-identification rules and data-type rules; and (d) storing the received data in a data repository connected to the network.

In a preferred embodiment, the method is practiced on the Internet network. In one aspect of the method in step (a), the data reporting modules are characterized by the types of data each module reports. In another aspect of the method, in step (b), network communication between the site-tracking application and the tracked Web sites is achieved through hyperlinking. In preferred aspects of the present invention, the purpose for mining data from the Web-sites is to enhance capability of software engineers to write software routines to enable and maintain automated, functional access to services offered by the Web sites.

Now, for the first time a method and apparatus is provided that allows automated site tracking and reporting back to Web-developers such that they may function in a more efficient and streamlined fashion.

BRIEF DESCRIPTION OF THE DRAWING FIGURES

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
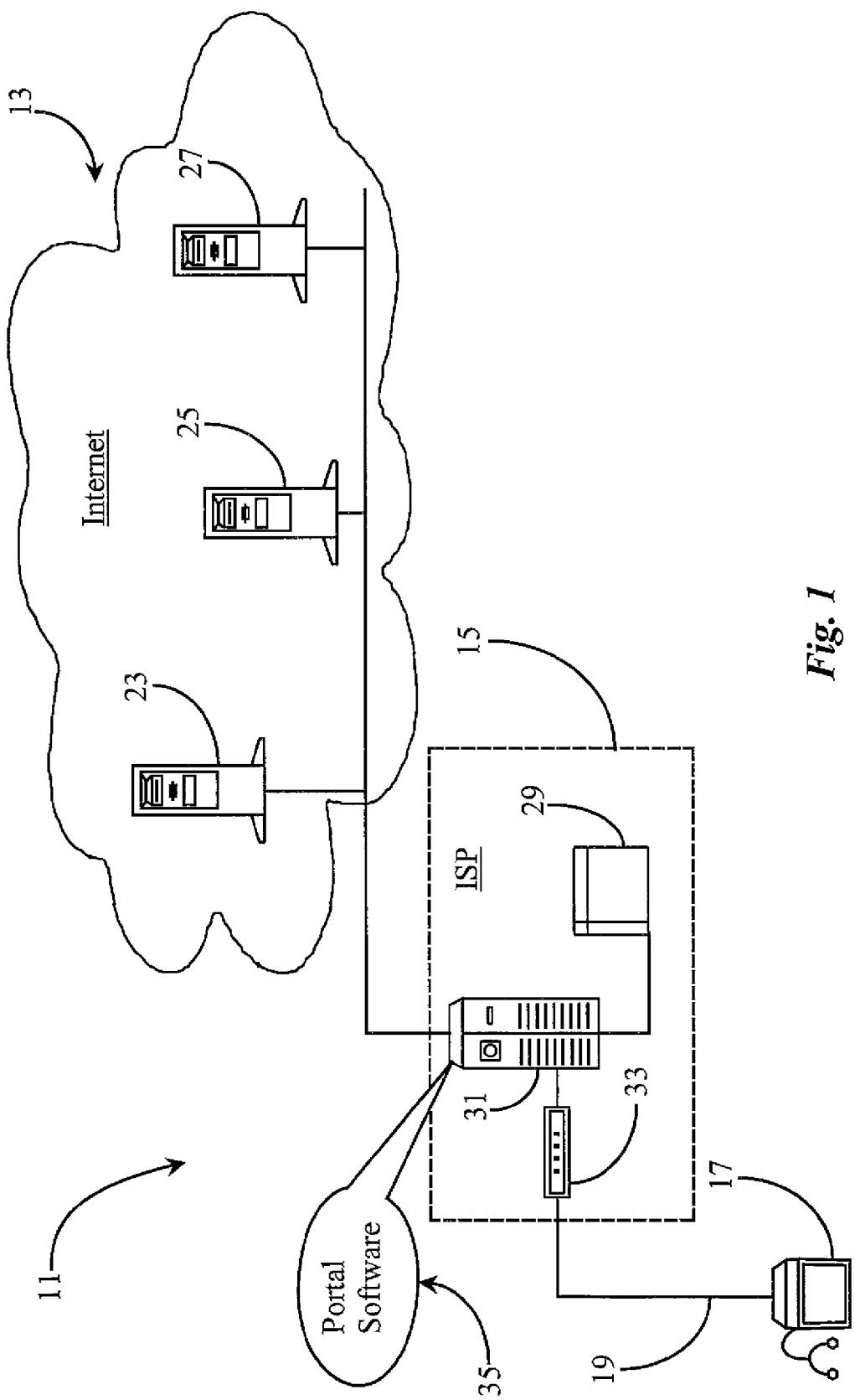
FIG. 1 is an overview of an Internet portal-system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well-known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
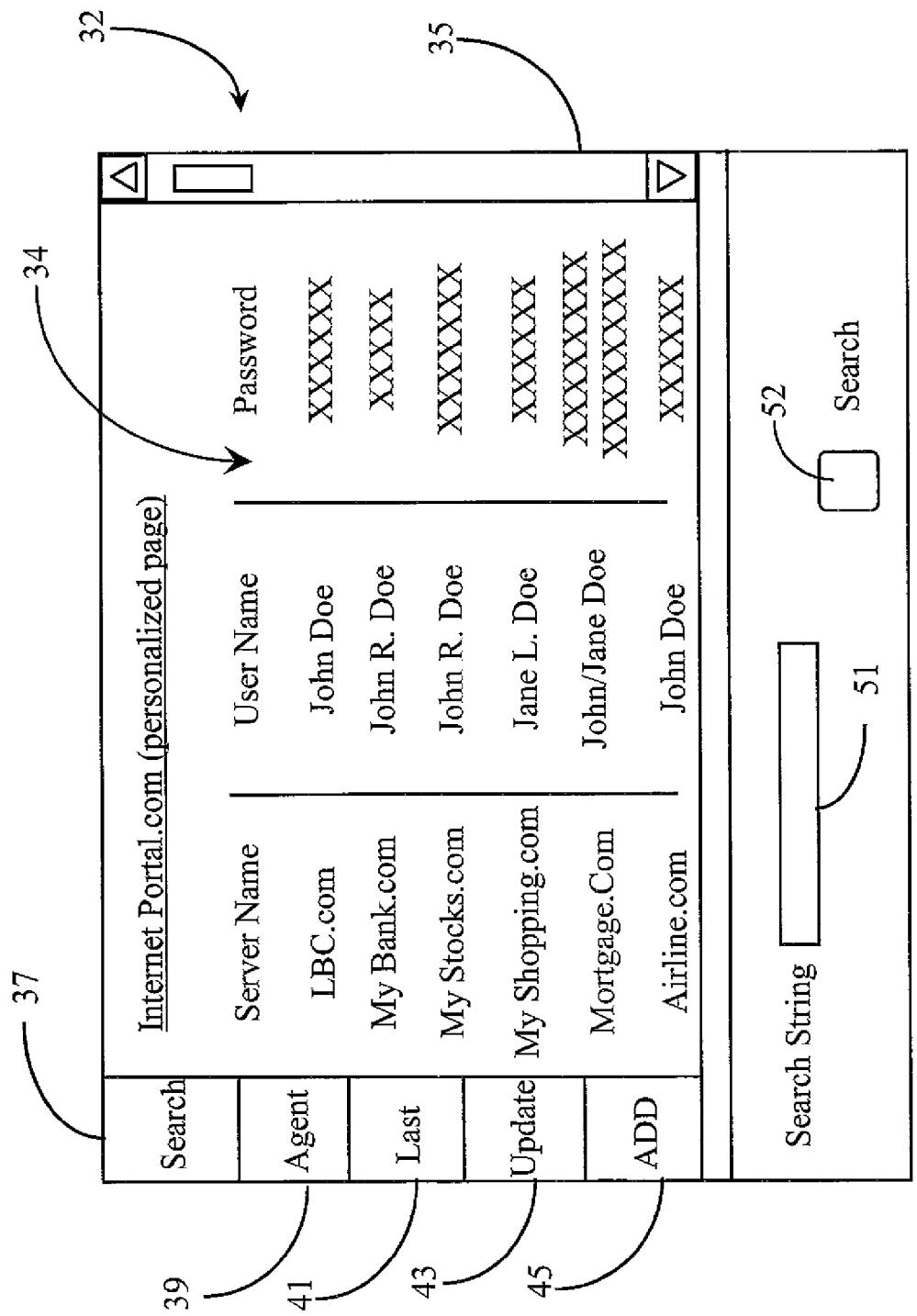
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but, given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password-All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention a knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
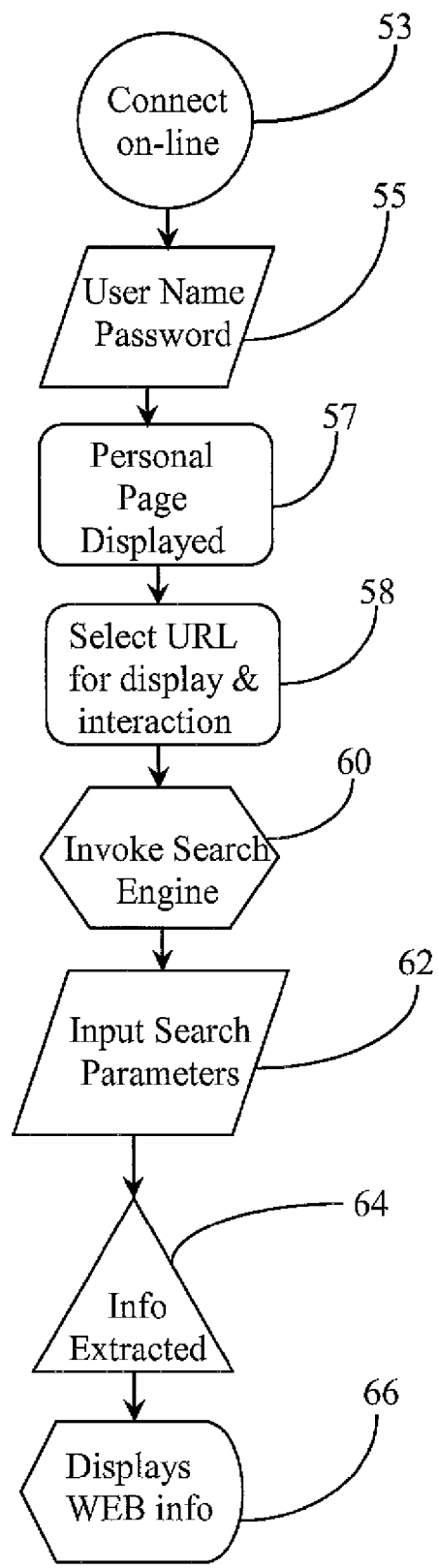
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Distributed CoBrand Application

According to an embodiment of the present invention, a cobrand architecture 67 is provided and adapted to enable efficient cobranding between a service provider and multiple cobrand partners. Architecture 67 comprises a mix of elements, which are known in the art, and those which are provided to enable practice of the present invention. Elements, which are known and existing in the art will be described as such while elements new to the art will be described within the scope of the present invention.

Figure 4:
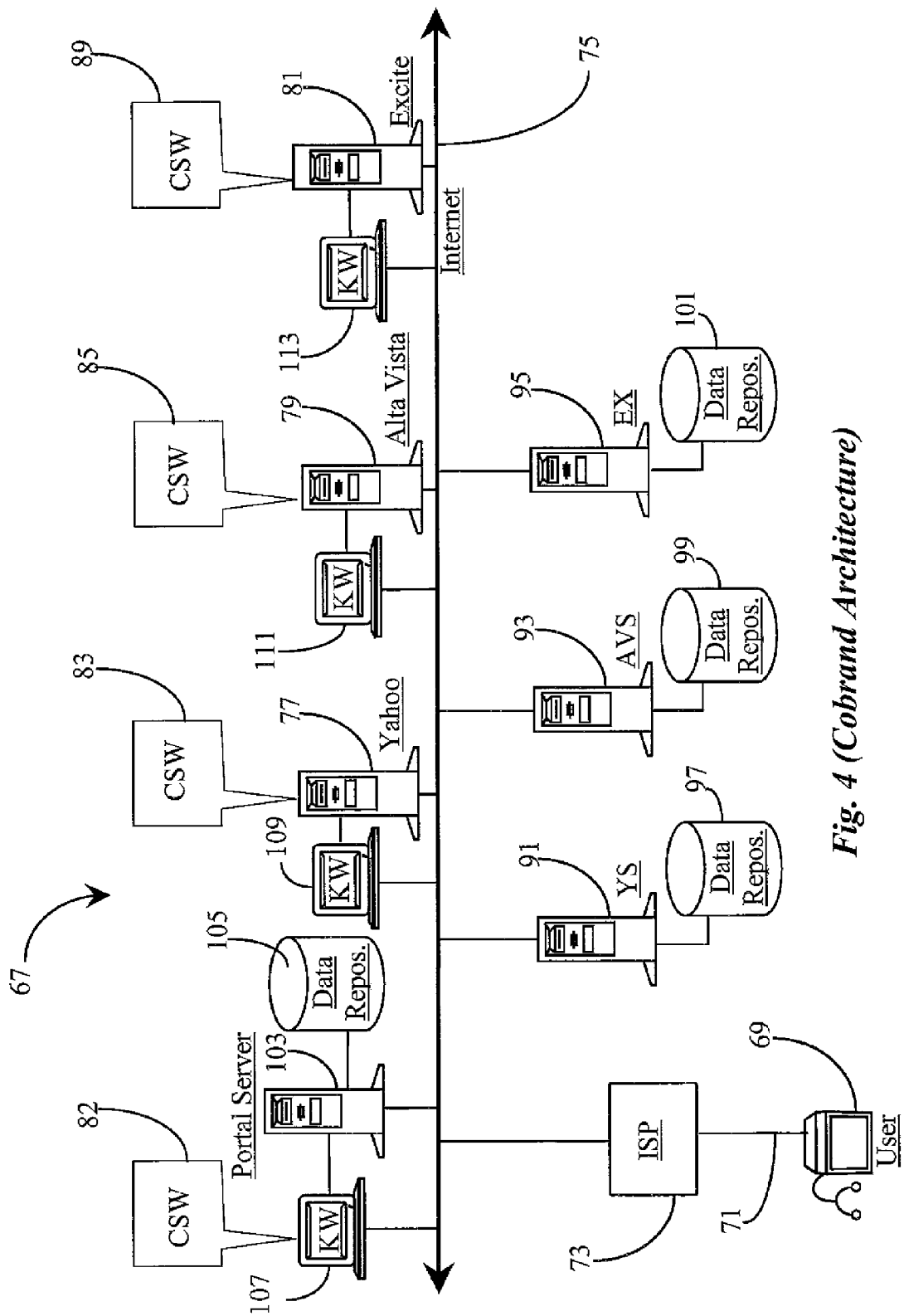
FIG. 4 is an overview of cobrand architecture according to an embodiment of the present invention.

FIG. 4 is an overview of cobrand architecture 67 according to an embodiment of the present invention. An Internet backbone of 75 is illustrated herein and represents all of the known lines, connection points, and equipment that make up the Internet network as a whole. Therefore, there is no geographic limit to the practice of the present invention. Connected to Internet backbone 75, are 4 exemplary servers. These are, a portal server 103, a portal server 77, a portal server 79, and a portal server 81. In this example, each portal server 103 through 81 is connected to backbone 75 by virtue of network connections as is known in the art.

Portal server 103 represents a server hosted by a main service provider seeking to cobrand services to business partners termed cobrand partners by the inventor. Server 77 represents a portal server hosted, in this example, by a company known as Yahoo™, which provides search and portal services to users. Server 79 and server 81 are hosted, in this example, by the well-known companies AltaVista™ and Excite™ respectively. Each of the three aforementioned companies specialize in providing search capabilities and limited portal services to registered users and/or subscribers. The companies hosting servers 77, 79, and 81 may be termed cobrand partners of a service-providing company hosting server 103.

Servers 77-81 may be adapted for other services and may be hosted by other companies than the services and companies mentioned in this example without departing from the spirit and scope of the present invention. The inventor chooses to illustrate server 77-81 as being hosted by the aforementioned companies simply because they are well-known and enjoy a large customer base. It may be assumed in this example, that each company hosting a portal server has at least one knowledge worker under employ as illustrated in this example by a knowledge worker 107 associated with portal server 103, a knowledge worker 109 associated with portal server 77, a knowledge worker 111 associated with portal server 79, and a knowledge worker 113 associated with portal server 81.

Knowledge workers 107-113 are endowed with various computer programming and engineering skills that are required for successful function of each hosting company. In actual practice, there would likely be many more knowledge workers under the employ of each company than are illustrated in this example. The inventor deems that the illustration of 4 such knowledge workers is adequate for the purpose of explanation of the present invention. In this example, knowledge workers 107-113 have connections to Internet backbone 75 and separate data connections to associated servers 103-81. It may be assumed that knowledge workers 107-113 are operating powerful personal computers as illustrated herein by computer icons.

Also illustrated as connected to Internet backbone 75, are servers 91, 93, and 95. Servers 91-95 represent Internet servers hosted by a company (service-providing company) also hosting server 103. Server 91, also labeled YS (Yahoo Server) is provided for cobrand subscribers visiting server 77. Similarly, server 93, also labeled AVS (Altavista server) is provided for a cobrand subscribers visiting server 79. The same is true for server 95, also labeled EX (Excite). Servers 103, 91, 93, and 95 have data repositories connected thereto and adapted for storing information about subscribers such as account information, profile information, user name and password information, and any other data about subscribers that may be deemed applicable for storage. For example, a data repository 105 is connected to portal server 103. Similarly, data repositories 97, 99, and 101 are connected to servers 91, 93, and 95 respectively. Data repositories 105-101 may, in one embodiment, be internal repositories instead of external repositories. Furthermore, servers 77, 79, and 81 may also be assumed to have data repositories connected thereto although none are shown.

A user 69, illustrated herein by an Internet appliance icon, connects to an Internet service provider (ISP) 73 by virtue of a telephone line 71. ISP 73 is adapted to provide standard dial-up Internet connections as is known in the art. ISP 73 is connected to Internet backbone 75 by virtue of an Internet-access line of 74. Telephone line 71 may be a normal connection-oriented-switched-telephony (COST) telephone line, or it may be a digital service line adapted for fast Internet connection such as a digital subscriber line (DSL), an integrated-services-digital-network (ISDN) line, or any other type of telephone line. User 69 may also access Internet 75 via a wireless connection without departing from the spirit and scope of the present invention. All that is required for user 69 to access Internet 75, is an Internet appliance capable, by virtue of software, for accessing the Internet and an appropriate connection means such as to ISP 73. It will be apparent to one with skill in the art that there are many alternative methods for connecting to an Internet network.

In this example, user 69 represents any number of users accessing the Internet for the purpose of interacting with Web services provided by the companies hosting servers 77, 79, 81, and in some embodiments, server 103. For purpose of discussion, it is assumed herein the user 69 is a regular patron of at least Yahoo™, Alatavista™, and Excite™. Furthermore, the skilled artisan will appreciate that there they may be many more services hosted by still more companies that are accessible to users through Internet 75 that are not represented in this example. It is restated herein, that the company hosting portal server 103 also maintains and hosts servers 91, 93, and 95, on behalf of companies hosting servers 77, 79, and 81, in the spirit of a unique cobrand relationship between the companies. It is to this aspect that the method and apparatus of the present invention relates.

A novel cobrand software application (CSW) 82 is illustrated herein as accessible to KW 107. CSW 82 is provided and adapted as a self-contained configuration application which enables a cobrand service to be created and implemented without requiring extensive software engineering, software installation, hardware reconfiguration, or other extensive effort normally required of a service-providing company engaged in implementing cobrand services through Web interfaces maintained by cobrand partners, represented in this example, by Yahoo™, Altavista™, and Excite™. CSW 82 is termed a cobrand control panel by the inventor, and may be referred to, hereinafter in this specification, as a cobrand control panel or simply control panel. It is noted herein, that instances of cobrand control panel (CSW) are illustrated as resident in servers 77, 79, and 81, and accessible to KWs 109,111, and 113 respectively. These instances of control panel are labeled with element numbers 83, 85, and 89. Control panel instances 83-89, running on servers 77-81 respectively, represent a received versions of cobrand control panel 82 distributed over Internet backbone 75 by a company hosting portal server 103 and providing cobrand services.

In practice of the present invention, the existence of cobrand control panel 82 in combination with cobrand architecture 67 provides a streamlined and efficient method for creating and implementing cobrand services on behalf of cobrand partners hosting servers 77-81.

Instead of attempting to install cobrand functionality to servers 77-81, the company providing cobrand services, which in this example, is a company hosting portal server 103 provides and maintains Web servers 91-95 has dedicated cobrand Web sites for the companies hosting servers 77-81. Distributed instances of control panel 82 (83-89) are self-contained toolkits which may be manipulated by KWs 109-113 respectively for the purpose of selecting offered services and authoring HTML Web pages that will be installed in servers 91-95 respectively. Each cobrand partner controls the look and feel of authored cobrand Web pages such that individual users, represented herein by user 69, are unaware that the added functionality made available by the providing company is not generic to a cobrand partner's normal service.

A general process for implementing successful cobrand services on behalf of a cobrand partner maybe understood through discussion of the following example. KW 107 distributes generic control panel 82 over Internet backbone 75 to server 77 (Yahoo™) where it appears as distributed control panel 83. Control panel 83 contains complete description of all offered services and the appropriate Web-building tools for creating Web interfaces. An example of such a tool would be an HTML editor. KW 109 accesses control panel 83, selects services, and builds WEB pages giving access to the selected services. Control panel 83 allows KW 109 to import features generic to existing Yahoo™ interfaces for creating cobrand Web pages that mirror Yahoo's look and feel.

When KW 109 has completely configured control panel 83, it is submitted back to its source (portal server 103) and is again accessible to KW 107. KW 107 reviews and approves the completed control panel and installs the complete package into reserved server 91 and data repository 97. A hyperlink to server 91 is provided and embedded on such as a main page within server 77 along with an interactive registration form if applicable. In one embodiment, only a hyperlink is provided and server 77 and user registration takes place and server 91. A hyperlink provided within a portal page hosted on server 77 linking to a page hosted in server 91 may be a simple icon labeled my accounts, or some other applicable name.

After cobrand services are installed and active within server 91, user 69 may access server 77 during the course of normal Internet navigation and interaction. Upon noticing and invoking the provided linked to server 91, user 69 may be prompted to register for receiving added functionality, after which, he or she may ad Web accounts for servicing. In this example, the company hosting portal server 103 specializes and data gathering and aggregation through a single interface. However, this should not be construed as a limitation to practice of the present invention. A service providing company may offer a wide variety of disparate Internet services, and may cobrand such services using the method and architecture of the present invention.

Once user 69 is registered and authorized two use cobrand services setup and running in server 91, he or she may also register for and setup accounts for cobrand services offered through server 79 and 81. In this way, data gathering an aggregation services may be obtained for all of a user's Web accounts and/or services with through Web interfaces frequently visited by and known to user 69. In one embodiment, the service-providing company handles all registration requirements for new users. That is to say that once user 69 clicks on an appropriate hyperlink embedded in a main page posted in one of server 77-81, he or she will be immediately directed to the appropriate cobrand server 91-95 to begin registration. In this embodiment, every aspect of servicing users is performed by the service-providing company. The only requirement of a cobrand partner in this case is to maintain a link to an appropriate cobrand server. The exact implementation of individual responsibility with respect to registration and billing will depend on the nature of agreement between the participating companies. There are many possibilities. More detail about a cobrand control panel will be provided below.

Figure 5:
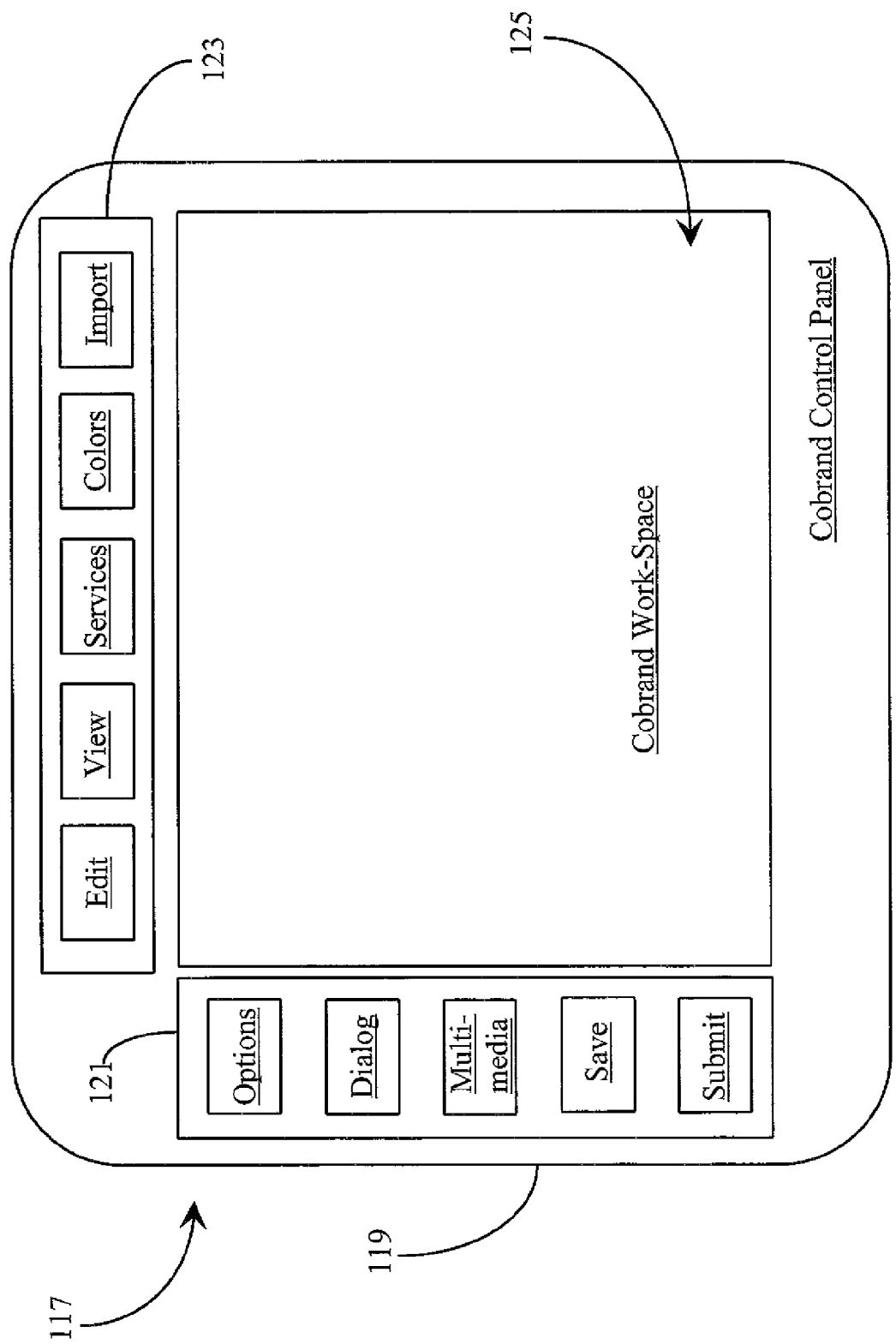
FIG. 5 is a plan view of a cobrand control panel according to an embodiment of the present invention.

FIG. 5 is a plan view of a cobrand control panel 117 according to an embodiment of the present invention. Cobrand control panel 117, in this example, is analogous to control panel 82 illustrated in FIG. 4 above. Control panel 117 is a self-contained toolkit as previously described with reference to control panel 82 of FIG. 4. In this example, a control-panel window is displayed on an appropriate PC monitor upon invocation of software 117, which may first appear as a control panel .exe icon. In this embodiment, control panel 117 represents an installable application, which would be installed as a permanent program on an appropriate computer connected to a receiving server, or on the receiving server accessible by a connected computer. In another embodiment, control panel 117 maybe provided installed in a separate server, which is accessed over the Internet by knowledge workers of cobrand prospects. There are many possibilities.

Control-panel window 119 comprises, in this example, a tool bar 121, a tool bar 123, and a cobrand workspace 125. Tool bar bars 121 and 123 are provided and adapted with controls, which may be invoked by a knowledge worker configuring a cobrand service-package. In place of active tool bars, a drop-down menu or menus may be provided without departing from the spirit and scope of the present invention. There are many possible implementations. For example, tool bar 123 contains an edit, function labeled as such, that is provided for enabling editing of completed portions of control panel 117. A view function, labeled as such, is provided within tool bar 123 and adapted for enabling viewing of various portions or steps of cobrand configuration process. A services function, labeled as such, enables a knowledge worker to browse and select offered services for implementation. A colors function, labeled as such, is provided within tool bar 123, and enables a knowledge worker to implement color schemes and so on to works in progress. In import function, labeled as such, is provided within tool bar 123, and is adapted to enable a knowledge worker to import features and functionality generic to the particular cobrand partner. Proprietary logos, copyrighted material, images, proprietary search interfaces, and so on are examples of imported features.

Tool bar 121 contains additional exemplary functions, which will be described individually as follows. An options function is provided within tool bar 121 and adapted to enable a knowledge worker to browse various options available in configuring cobrand package. In a dialog function, labeled as such, is provided within tool bar 121 and adapted to enable a knowledge worker to create interactive dialog functions and embed them into cobrand Web pages. A multimedia function, labeled as such, in spite of within tool bar 121 and adapted to enable a knowledge worker to create and embed multimedia functionality into cobrand Web pages. A save function, labeled as such, is provided within tool bar 121 and adapted to enable a knowledge worker to save completed works. A submitted function, labeled as such, is provided within two or 121 and adapted to enable a knowledge worker to submit a completed cobrand package to a service-providing company. A cobrand workspace 125 is provided within cobrand window 119 and adapted as a workspace for generating HTML pages, testing various functions, and so on.

The inventor intends that control panel 117, as described in this example, represent just one possibility among many alternative possibilities for implementing an interactive and self-contained control panel for configuring cobrand services. Furthermore, the functions represented within tool bars 121 and 123 are intended to be exemplary only of types of functions that may be provided within control panel 117. One with skill in the art will appreciate that there may be many alternative presentations. Control panel 117 contains all of the functions required in order to successfully create, configure, and implement a cobrand-service.

Figure 6:
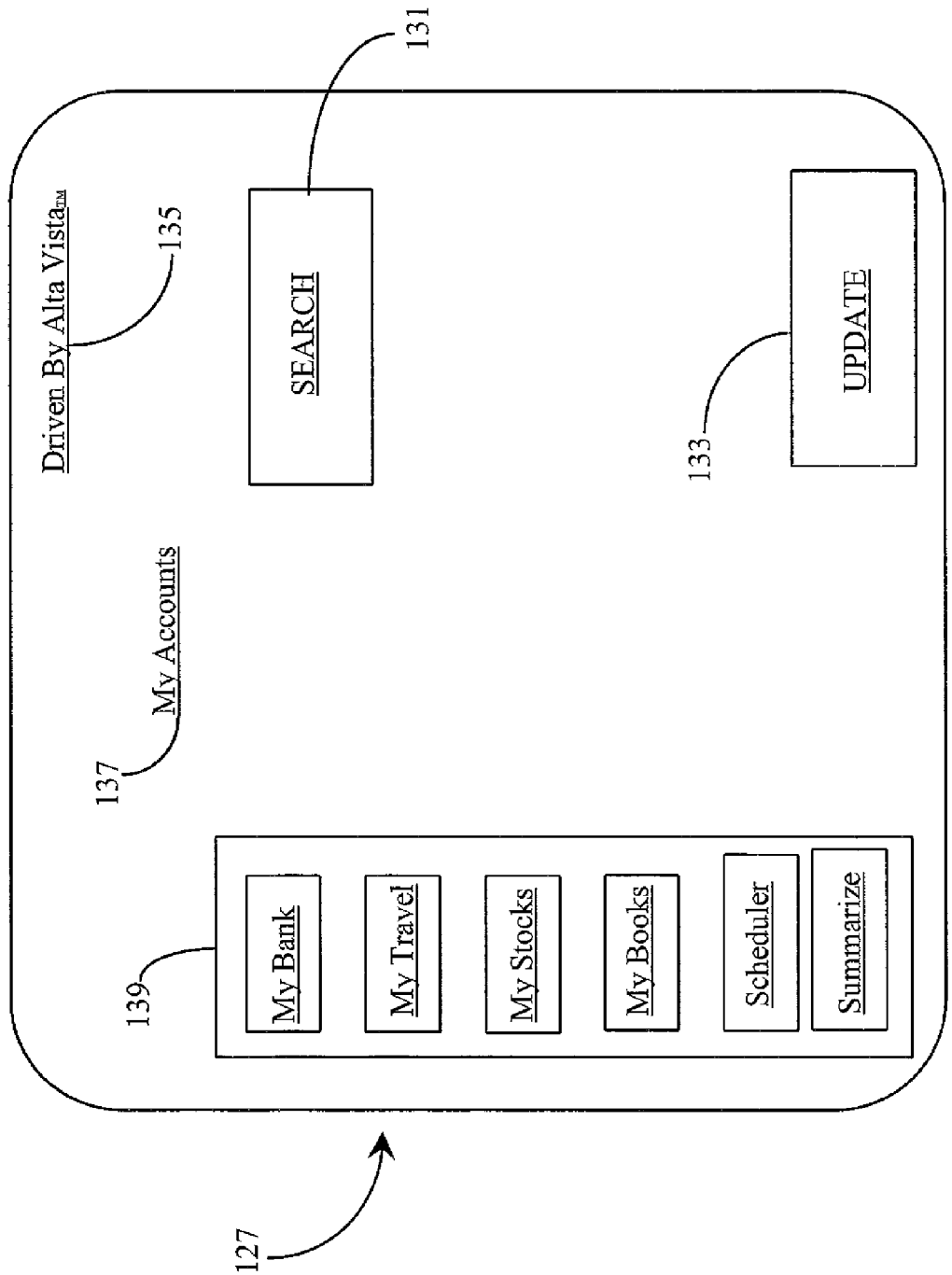
FIG. 6 is a plan view of a cobrand user interface according to an embodiment of the present invention.

FIG. 6 is a plan view of a cobrand user interface 127 according to an embodiment of the present invention. Cobrand-user interface 127 is, in preferred embodiments, an interactive web page created from within control panel 117 of FIG. 5, and hosted on one of cobrand servers 91-95 of FIG. 4. Interface 127 may be assumed to be a main cobrand web page as seen by a user interacting with cobranded services. In a case wherein a service-providing company is a data aggregation service, then interface 127 may represent a starting page or a portal page from whence numerous accounts may be aggregated and summarized for data. A title for interface 127 may be as simple as a title illustrated herein as My Accounts and labeled with element number 137. In the particular example, a text notation labeled Driven by AltaVista™ and represented by element number 135, identifies the particular cobrand partner. As previously described, interface 127 may have although look and feel of a main public interface hosted by AltaVista™ such that a user is not aware of the involvement of a service-providing company and providing value-added services.

A search interface 131 is provided an embedded within interface 127 and is adapted to enable a user to perform a keyword search. Interface 131, may be a version of the interface that is available on a cobrand partner's main web page. Preferably, the look and function of interface 131 is identical to a standard search function provided by a cobrand partner made available to it's standard user fair. A tool bar 139 is provided an embedded within interface 127. Tool bar 139 contains interactive selections of the user accounts added to page 127, presumably after a user has completed registration. Listed accounts are, from top to bottom, My Bank, My Travel, My Stocks, and My books. These exemplary accounts are intended to represent just some of possible accounts that may be configured to cobrand services by a user. Tool bar 139 also contains a scheduler function and a summarize function. An update function 133 is provided within interface 127 and adapted to enable a user to obtain periodic updates concerning accounts list 139 up to left.

It will be apparent to one with skill in the art that there may be many more functions provided an embedded in web page interface 127 that are illustrated in this example without departing from the spirit and scope of the present invention. The inventor intends that the functional elements represented herein are only exemplary of many such possible functions and interfaces that may be embedded into Web page 127.

In this particular example, a user accessing cobrand web page 127 may retrieve data summaries from the configured accounts illustrated in tool bar 139 by selecting each account and then selecting summarize using a summarize function, labeled as such, and provided within tool bar 139. In one embodiment, data may be retrieved from all of the listed accounts and summarized. A scheduling function, labeled as such, is provided within tool bar 139 allows a user to specify the time or time period for obtaining data, performing summaries, and so on. An update function 133 is available within interface 127 and adapted to allow a user to simply update any of the accounts listed in tool bar 139.

It will be apparent to one with skill in the art, that interface 127 may contain functionality and user-operated controls that are different than what is represented herein without departing from the spirit and scope of the present invention. The exact functionality built into interface 127 will depend on the services provided by the service providing company and the extent that such services are harnessed by cobrand partners.

It will also be apparent to one with skill in the art, that by providing a self-contained cobrand control panel 117 to be utilized in conjunction with cobrand architecture illustrated more particularly with servers 91, 93, and 95, of FIG. 4, much of the time and resource associated with prior-art cobranding techniques and architecture may be eliminated.

Ad-Broker Architecture

As described in the background section, prior-art advertising wherein ad servers are used to deliver banner ads over a data-packet-network (DPN) into common user interfaces is rather limited in efficiency by virtue of the fact that the various ad servers delivering ads do not associate similar ads with similar key words. As a result, disparate ads are routinely delivered to a same user that uses multiple interfaces. The inventor provides a method and apparatus that acts to normalize advertisements sent by disparate advertisement companies such that similar ads are delivered to multiple interfaces frequented by a same user.

Figure 7:
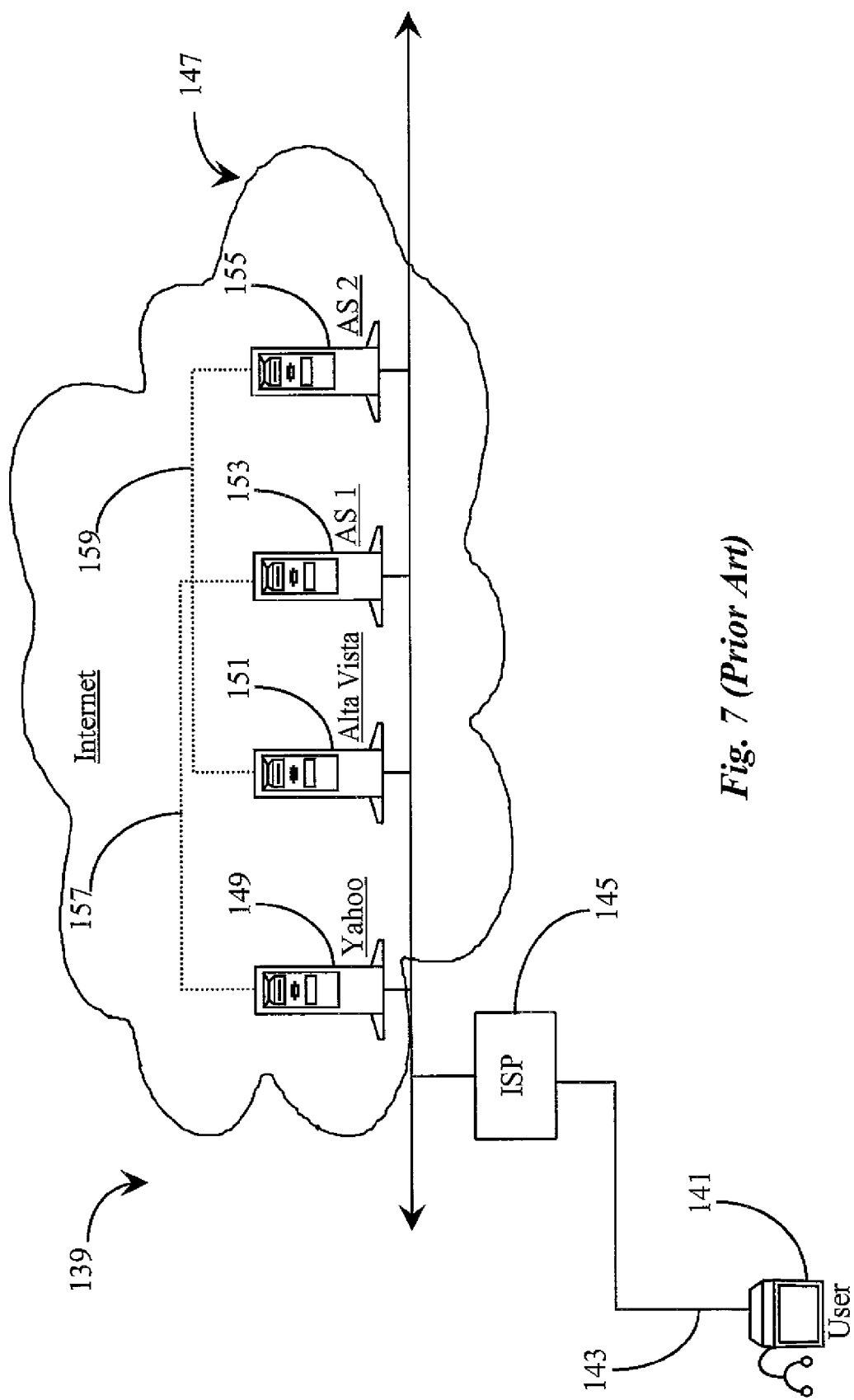
FIG. 7 is an overview of a communication network wherein banner advertising is practiced according to prior art.

FIG. 7 is an overview of a communication network 139 wherein banner advertising is practiced according to prior-art. Network 139 utilizes an Internet network represented herein by element number 147 as a medium of communication. Internet 147 is chosen as a preferred communications medium in this prior-art illustration because of it's high public access characteristic.

A user 141 is illustrated, in this prior art example, as connected to an Internet Service Provider (ISP) 145 using an Internet capable appliance such as a personal computer running Internet capable software. Access to ISP 145 may be accomplished through a connection-oriented telephone network such as the well-known public-switch telephony network (PSTN) as is known in the art. An Internet access line 143 represents such as a cable-modem connection, a typical dial-up connection, an ISDN connection, a wireless digital connection, and so on. In this prior art example, ISP 145 is implemented as a dedicated provider using an Internet connection server (not shown) for providing Internet access. The arrangement illustrated herein for enabling user 141 to access Internet 147 is generally known in the art.

ISP 145 is connected to Internet 147 by virtue of an Internet access line as illustrated. Other equipment known in the art to be present and connected to a network such as Internet 147, for example, IP data routers, data switches, gateway routers, and the like, are not illustrated in this prior art example, but may be assumed to be present.

Four Internet file servers 149, 151, 153 and 155, are illustrated as connected to Internet 147, which is also represented by a double arrow intended to illustrate an Internet backbone. In this prior-art example, server 149 represents a portal server hosted by Yahoo™, which is a well-known company providing on-line search services. Server 151 represents yet another portal server hosted, in this example, by Alta Vista™, which is another well-known data-search provider.

Yahoo™ and Alta Vista™ are examples of well-known companies that provide, Internet portal services including user WEB-directories and/or search engine interfaces for performing data searches on the Internet. Other similar services known in the art are hosted by such companies as Hotbot™, Dog Pile™, Info-Search™, and so on. Functionality provided by servers 149 and 151 is typically dependent on the exact nature of services offered by the hosting companies. Generally speaking, however, it may be assumed that user 141 may access Internet 147 and perform, at least, a data-search operation from either server 149 or server 151.

Servers 153 and 155 are intended to represent advertising servers and are labeled AS1 and AS2, herein. As is well known in the art, banner advertisements are advertisements that are sent to Internet users. These ads are, in one aspect, generated based on keywords or search phrases that a user exerts at a search engine prompt. In another aspect, banner ads are associated with embedded keywords or phrases associated with a user's interface. Each banner advertising company uses a unique keyword selection to generate a certain banner ad. For example, if a user exerted the keyword travel while searching from server 149 hosted by Yahoo™, a banner ad may be sent from ad server 153 (AS 1) soliciting a trip to Hawaii. If a same user exerted the same keyword travel while searching from server 151 hosted by Alta Vista™, a banner ad may be sent from ad server 155 (AS 2), soliciting a trip to Florida. Dotted-line connectors 157 and 159 are used to draw an association between Yahoo™ server 149 and ad server 153, and between Alta Vista™ server 151 and ad server 155. This association is a business one and is typical in prior art practice. That is to say, that one advertising company will generally service one portal company. Therefore, ad servers 153 and 155 will use different key-word associations, which trigger differing advertisements. It may be assumed in this example, that servers 153 and 155 are hosted by disparate advertising companies in competition with each other.

According to prior-art practice, user 141 connects to Internet 147 via connection 143 and ISP 145. User 141 may elect to perform a search at Yahoo™ server 149 or at Alta Vista™ server 151. Although not shown herein, user 141 exerts a keyword or search phrase during a data-search session as is known in the art. Based on the entered keywords or phrases, various URLs are retrieved from each search-engine's or directory's data-base and the results are then displayed at the user interface.

As keywords or phrases are entered, such keywords or phrases may be used to cause banner ads from either server 153 or 155 (depending on which portal server is in use) to be delivered into the appropriate and associated user interface.

As described above, servers 153 and 155 are hosted by disparate advertising companies who create and provide banner ads to user interfaces at servers 149 and 151 respectively. Examples of advertisement companies engaged in banner advertising on Internet 147 would include such known companies as Double Click™ and Net Gravity™. The aforementioned advertising companies present their banner ads on behalf of the advertised company in exchange for a commission. For Example, Double Click™ may have an agreement with an airline company, such as American Airlines The agreement may be such that if a user is searching for airline tickets to Hawaii at server 151 (Alta Vista™), for example, and exerts a keyword phrase tickets to Hawaii, an American Airlines™ad might be sent by virtue of the ad server 155, to the associated user interface. If, for example, user 141 responds to this ad by either clicking on the banner ad or elects to make a purchase of tickets from American Airlines™, it is assumed that a revenue of that click-through or sale would be paid to Double Click™ and perhaps a portion thereof to Alta Vista™. This business practice is well-known in the art.

In this prior-art example, banner ads are sent to a user based solely on exerted keywords or phrases exerted during a data-search and are rather impersonal. Furthermore, because servers 153 and 155 are not affiliated, there is no standardization of keywords to types of banner ads. As a result, there is a limited success or hit rate (user click) connected to delivered banner ads. Furthermore, a same user may get widely differing ads from portal to portal even though a same keyword or phrase is used in search engines. Similarly, active, in-depth, profiling of users is not typically performed by most service providers. Therefore, an ad agency does not have the ability to decide whether to send, for example, an ad from a real estate company that has featured homes in a $100,000 bracket or from a company that has featured homes in the $750,000 bracket. It would be ineffective to send an ad for a higher priced home to a moderate wage earner. The inventor provides a unique solution to the above-described limitations. Such a solution is described in detail below.

Figure 8:
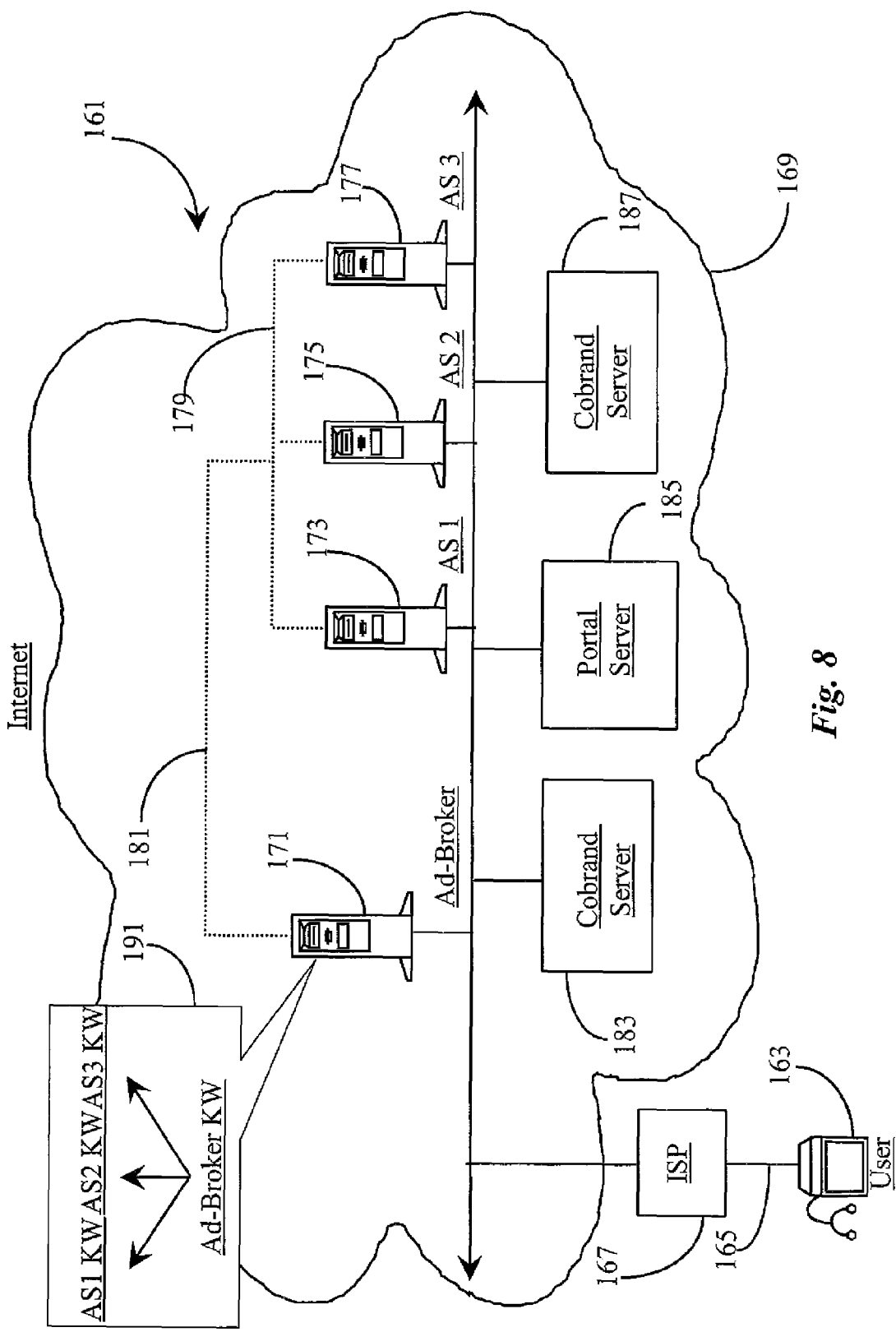
FIG. 8 is an overview of a communications network wherein banner advertising is practiced according to the present invention.

FIG. 8 is an overview of a communications network 161 wherein banner advertising is practiced according to an embodiment of the present invention. In this example of the present invention, the well-known Internet network, represented herein with element number 169 is chosen by the inventor as a preferred medium of communication for the same reasoning described in FIG. 7. However, this should not be considered limiting, as the invention could apply in other networks and combinations of networks.

In this embodiment, a user represented herein by element number 163 (Internet-appliance icon) is illustrated as connected to an ISP 167 by virtue of an Internet connection line 165. In turn, ISP 167 is connected to Internet network 169 via an Internet access line as is known in the art. User 163, line 165, and ISP 167, may be assumed to be analogous to user 141, line 143, and ISP 145, as described in FIG. 7. Also as described in FIG. 7, additional equipment known in the art to be present and connected to an Internet network such as Internet Network 169 may be assumed to exist in this example. Examples of such equipment include, but are not limited to, IP data routers, data switches, gateway routers, and the like. It may also be assumed in this example, that Internet connection is achieved through a connection-oriented network such as the well-known PSTN.

A double-arrowed line illustrated with an Internet network 169 represents an Internet backbone and may be assumed to contain all of the lines, connection points, and equipment known to make up the Internet network as a whole. Therefore, there's no geographic limit to the practice of the present invention.

In this example, three advertisement servers are illustrated as connected to the backbone of network 169. These are, ad server 173 (AS 1), ad server 175 (AS 2), and ad server 177 (AS 3). As described above, ad servers are hosted by advertising companies that send banner ads to a user interface based on search functions, and in some cases content keywords contained in within a user interface.

In a preferred embodiment of the present invention, a unique server labeled herein with element number 171 is provided within network 169 and adapted as a broker-server that communicates with each of servers 173-177. Server 171 is termed an ad-broker by the inventor. According to a unique method, ad-broker of 171 is dedicated to brokering the activities of servers 173-177 such that a standardization is created with respect to ad similarity in association with similar keyword attributes. Negotiation between ad broker 171 and servers 173-177 is illustrated herein by a dotted connector-tree 181.

A unique broker-software application 191 is provided and adapted to associate a specific set of keywords or phrases to individual ones of the banner-ads stored and servers 173-177. Application 191 is manipulated, in a preferred embodiment, by an ad-broker knowledge worker or administrator (not shown), the presence of which, may be assumed in this example. In actual practice, an ad-broker administrator would command a computerized workstation connected to the backbone of network 169, and would have access to server 171 and subsequently, servers 173-177. More about the function of application 191 will be provided below.

The example illustrated herein represents an embodiment wherein cobrand services are utilized as described with respect to FIGS. 4-6 above. In this regard, 2 cobrand servers are provided and illustrated herein as connected to the Internet backbone of Internet network 169. These are, cobrand server 183 and cobrand server 187. Servers 183 and 185 may be assumed to be analogous to servers 91-95 of FIG. 4 above. Also illustrated, is a portal server 185, which may be assumed to be analogous to portal server 103 of FIG. 4.

It was described further above, that cobranded services provide added functionality for subscribers to cobrand partners by redirecting them from partner-maintained servers to a user interfaces maintained in a server hosted by the service-providing company. In this way, users enjoy the benefit of existing services with added capability of managing multiple accounts from a single interface (data aggregation). It is desired by the inventor in this case that the banner ads streaming into these cobrand interfaces are somewhat normalized and personalized for users operating from within those interfaces. More particularly, it is desired that when a single user has multiple cobrand interfaces, that banner ads delivered thereto from disparate and companies are at least similar if not reflecting somewhat the status of the user as determined through profiling, and perhaps keywords or phrases derived from user content included within an interface.

Referring now back to FIG. 8, servers 183 and 187 are cobrand servers maintained in this example, by a company hosting portal server 185. Servers 149 and 151 of FIG. 7 are not illustrated in this embodiment, but may be assumed to be present. For example, server 183 might be a cobrand server setup for Yahoo™. Server 187 might be a cobrand server setup for Alta Vista™. There are many possibilities.

It may be assumed in this example, that user 163 has registered for a user interface in servers 183, 185, and 187. It may also be assumed in this embodiment, that one of servers 173-177 serves banner ads to one of servers 183-187 through an extension of normal contractual arrangement pre-existing between the advertisement companies and the cobrand partner companies previously described. Because servers 173-177 are not affiliated with one another and do not return similar ads based on similar keywords or phrases, it is the job of ad broker 171 to insure that similar keywords or phrases exerted from, or in some embodiments, embedded into user interfaces invoke the presence of similar advertisements sourced from disparate ad servers 173-177.

In order to accomplish the above-described goal, the company hosting ad broker 171, which in this case, is the same company hosting portal server 185, must work closely with each of the companies hosting servers 173-177. For example, all of the keywords and associated banner-ad descriptions must be obtained from server 173. The just-described process must be repeated for servers 175 and 177 respectively. This process is illustrated logically within application 191 by an arrow tree associating ad-broker keywords to disparate sets of ad-server keywords.

In one embodiment, a set of generalized keywords generic to ad-broker 171 is mapped to existing keywords used at each of ad servers 173-177. In this embodiment, each ad description is reviewed in order to determine if the particular ad it is appropriate for a particular ad-broker-generated keyword. In this case, a broker keyword travel may be mapped to existing keyword vacation with respect to ad server 173, resort with respect to ad server 175, and lodge with respect to ad server 177. In each case, the actual advertisements equated to each existing keyword with respect to ad servers 173-177 would be carefully reviewed to insure that they are appropriate and similar in scope with respect to each other.

In another embodiment, ad broker keywords are used in-place of existing ad server keywords at the location of each ad server hundred 173-177. In this case, each ad server 173-177 would utilize two sets of keywords. One for delivering ads to normal interfaces and one for delivering ads to cobranded interfaces. Standard Internet address recognition may be used to determine whether an ad is destined for a normal interface or a cobranded interface.

Information about users subscribing to cobranded interfaces may be solicited for the purpose of assisting ad broker 171 in creating a flexible set of keywords that function to return ads from servers 173-177 that are not just normalized, but also somewhat personalized to the status of a user. For example, an annual income reported by a user may be used to enhance ads streamed to that user. For example, a keyword travel may be created by administrator working with application 191 such that the keyword has three states. Each state of the keyword may reflect a certain income range of a user. If a user's annual income is over $150,000 annually, then the keyword travel a may be employed. Users earning between $80,000 and $150,000 annually may be assigned travel b. Users earning between 0 and $80,000 annually may be assigned travel c. Banner ads stored within servers 173-177 may be carefully selected and associated with various states of keywords or phrases. It is noted herein, that the analytical process that must be performed for reviewing banner ads and mapping broker keywords to existing ad keywords, or replacing ad keywords with broker keywords is performed by an administrator or knowledge worker as previously described. However, and one embodiment this determination process may be performed electronically using knowledge-base technology.

In one embodiment, keywords may be parsed from user interfaces and complied electronically. For example, instead of a knowledge worker making a logical determination pertaining to which keywords will be broker keywords, keywords may be randomly parsed from the HTML or other language contained within banner ads themselves. A banner ad may have the keywords, "cross-stitching", "knitting" and "women" contained therein. Banner ads of this nature, would only be sent to a user interface wherein profile information indicates that the particular user enjoys crafts and is of the female gender. In this case, a keyword set parsed from a particular banner ad is matched with the particular keyword set describing a user. Electronic matching of keywords sets may be accomplished from within ad broker 171 by virtue of broker application 191.

In an alternative embodiment of the present invention, user 163 may be a subscriber at portal server 185, which in this embodiment is not a cobrand server, but the portal server maintained by the same company hosting ad broker 171. It might be, that ad server 175 serves ads to portal server 185. In this case, ad broker 171 brokers ads for server 185 as well as servers 183 and 187, which cobrand servers.

In one embodiment of the present invention, a user subscribing to a portal service providing cobranded services may also utilize other portal services as described above. Through benefit of having an extensive profile knowledge of a particular user, the service-hosting company may work with advertising companies to extend ad normalization and customization to such users when they are utilizing normal portal interfaces such as Altavista™ or Yahoo™. Advertisements may be personalized to the extent of knowledge about a particular user by tracing the user's identity when he visits a non-cobranded interface. This can be accomplished through cookie exchange. In this way personalized ads may be caused to follow the user at other popular interfaces.

Site Tracker Architecture

Figure 9:
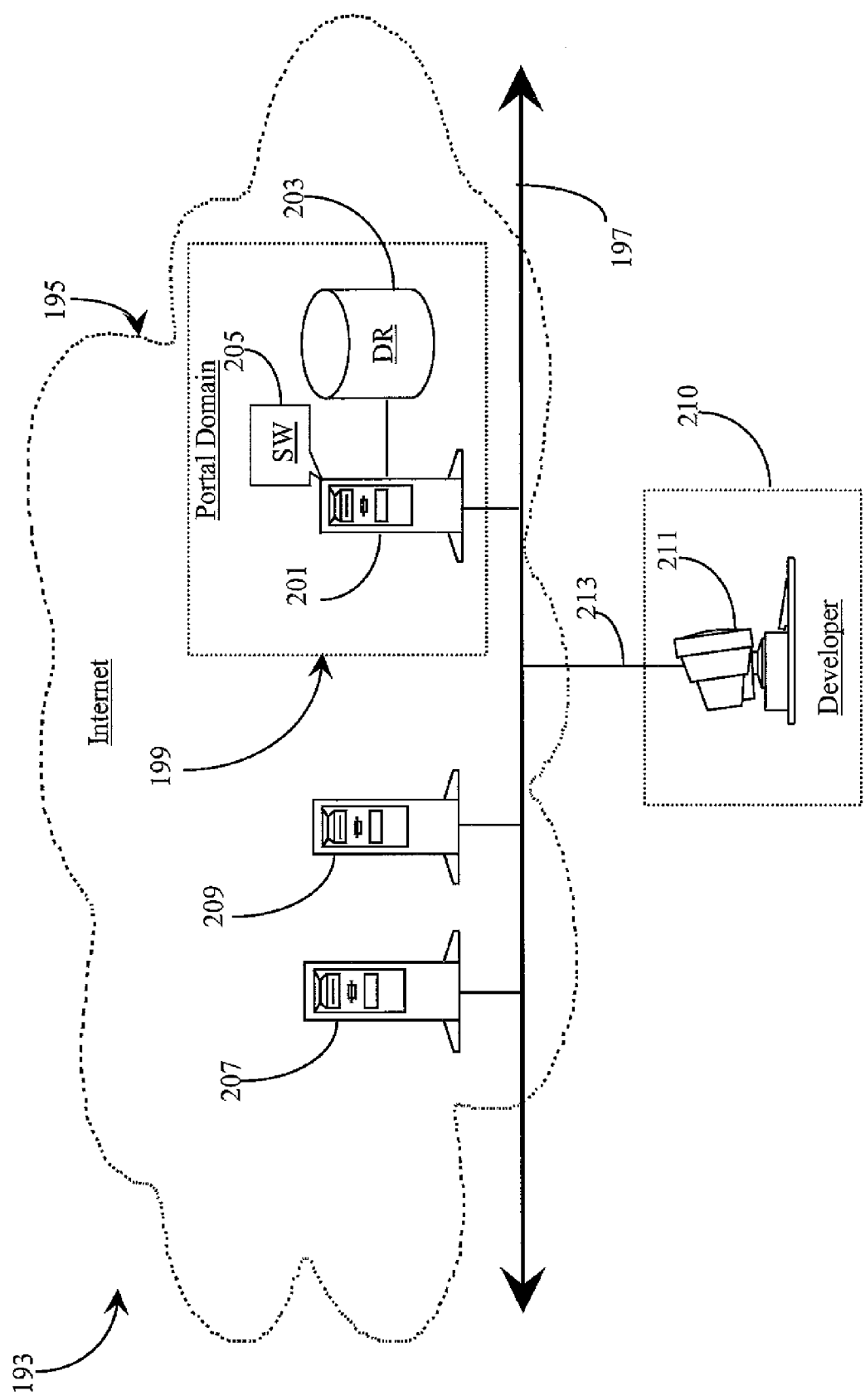
FIG. 9 is an overview of a network architecture wherein Web-site tracking is practiced according to an embodiment of the present invention.

FIG. 9 is an overview of a network-architecture 193 wherein Web-site tracking is practiced according to an embodiment of the present invention. Architecture 193 comprises a data-packet-network (DPN) 195, which in this example is the well-known Internet, a portal service domain 199, and an exemplary Web-developer 210. In this example, Internet 195 is chosen by the inventor as a preferred medium of communication because of it's high public-access characteristic. However, this should not be considered limiting, as the invention could apply in other networks and combinations of networks. Examples include, a corporate intranet, a private wide-area-network (WAN), and so on.

An Internet backbone 197 is provided within Internet network 193 and represents all of the lines, connection points, and equipment that make of the Internet network is a whole. Therefore, there is no geographic limitation to practice the present invention. A Web server 207 is illustrated within Internet 193 and connected to backbone 197. Web server 207 is adapted as an Internet server containing information pages known as Web pages in the art. Such information pages are typically hyper-text-markup-language (HTML)-scripted electronic pages that provide certain interactive services to users who patronize them. Another Web server 209 is illustrated within Internet 193 and connected to backbone 197. Web server 209 is adapted identically as Web server 207 described above. Servers 207 and 209 may in one embodiment, be shared by a plurality of companies providing Web-based services.

In this example it is assumed that individual Web pages contained in server 207 and 209 may be hosted by a variety of different service providers. In another embodiment, server 207 may be hosted by a single entity wherein all of the web pages contained therein belong to that entity. The same may be said of server 209, or a single host may own and control both sites. It is noted herein that there may be many more Web servers provided and connected to backbone 197 than are illustrated in this example. However, the inventors illustrates two such servers and deem such illustrations adequate for the purpose of explanation of the present invention.

A portal-service domain 199 is illustrated within Internet 193. Portal domain 199, enclosed within a dotted rectangle, represents a company providing Internet portal services to a plurality of subscribing users as is taught in application Ser. No. 09/208,740 listed in the cross-reference section above. Portal domain 199 may be assumed to include all of the required equipment and connections necessary for providing Web-portal services including proxy navigation and data-gathering services.

A Web server 201 is provided within portal domain 199 and illustrated as connected to backbone 197. Server 201 is adapted as a Website tracking server, which is enabled by virtue of a novel software instance (SW) 205. SW 205 is provided and adapted to enable server 201 to track various states, conditions and activity related to any electronic information pages (Web-sites) held in either of servers 207 or 209, which represent all servers connected to the Internet. A data repository (DR) 203 is provided within domain 199 and illustrated as connected to server 201 by virtue of a high-speed data link. Data repository 203 is adapted to store data pertaining to states, conditions, activities and any other relevant data about electronic information pages stored in servers 207 and 209, which are subject to monitoring by server 201. Data repository 203 may be an external data repository as is illustrated herein, or may be an internal repository to server 201.

In this example, portal domain 199 seeks to provide and maintain functional access by proxy on behalf of its subscribers to specific Web sites described above as being contained in servers 207 and 209. Functional access, as used in this specification, is defined as an ability to fully interact with Web pages hosted in servers 207 and 209 in fully automated fashion on behalf of subscribers without requiring any input from individual subscribers other than a simple request. Full interaction may include but is not limited to navigation, form filling, automatic login, automatic registration, data gathering, data summarizing, and automated purchasing. SW 205 functions to aid in realizing this goal, according to embodiments of the present invention, by providing an automated data pool, which is accessible through accessing repository 203. The data pool contains all of the current data that may be relevant to any monitored Web sites in organized and readily useable format.

Web-developer 210 operates a personal computer (PC) 211 connected to backbone 197 by virtue of an Internet connection path 213 in order to access servers 207, 209 and 201. In this example, developer 210 is operating from a remote location outside of portal domain 199. However, in another embodiment, developer 210 may be stationed within domain 199 and be connected to server 201 via a LAN connection. In this case, connection to backbone 197 may also be part of LAN capability. It is a responsibility of Web developer 210 to create functional software routines for enabling automated access to functional services offered through interactive information pages contained in servers 207 and 209. It is also the responsibility of developer 210 to maintain functional access to such services over time by adapting to any changes in states or conditions that occur for any of the target Web sites.

In practice a plurality of developers, each operating connected workstations, are employed for creating and maintaining functional access to Web site services selected for automation. The inventor illustrates a single developer and deems the illustration sufficient for describing the present invention. Moreover, there may be many more servers hosting Web sites connected to backbone 197 that are subject to monitoring than are illustrated herein. The inventor illustrates 2 servers, servers 207 and 209, for illustrative purpose only.

SW 205 empowers server 201 to monitor and obtain any relevant data from any activity specific to monitored Web sites available through servers 207 and 209. The data obtained in this fashion is stored in database 203 and is accessible to developer 210 as previously described. In a preferred embodiment developer 210 accesses site-tracking software 205 through a Web browser installed on PC 211. Developer 210 mines data from repository 203 for the purpose of facilitating performance of his or her responsibility, which is to create and maintain automated access to Web site services on behalf of subscribers and to maintain functionality of Web sites in this regard over time. More detail regarding the function of and interaction with SW 205 is provided below.

Figure 10:
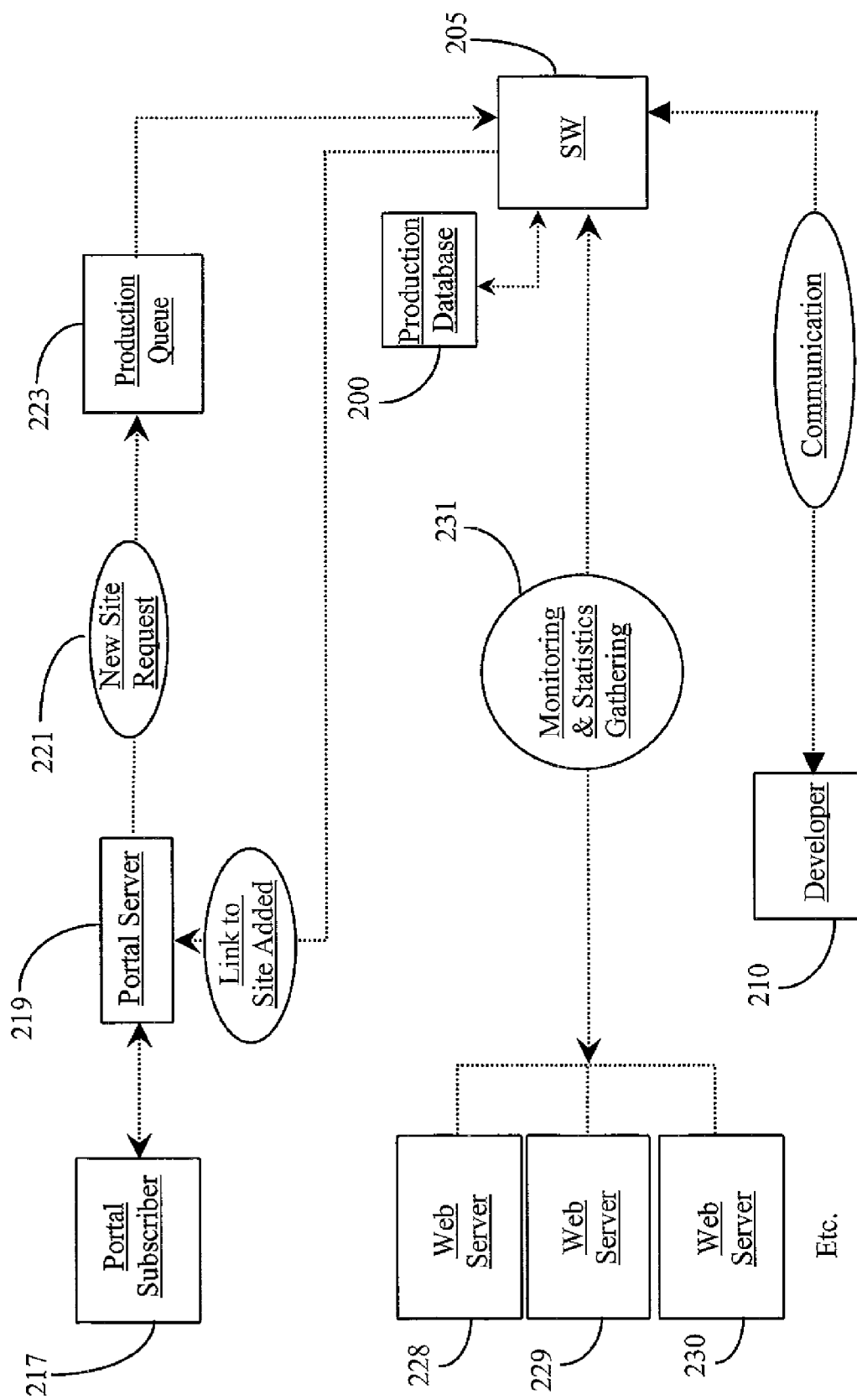
FIG. 10 is a block diagram illustrating various communication pathways and functionalities of a site-tracking interaction process according to an embodiment of the present invention.

FIG. 10 is a block diagram illustrating various communication pathways and functionalities of a site-tracking interaction process according to an embodiment of the present invention. This block diagram, according to an embodiment of the present invention, is intended to illustrate exemplary communication pathways and automated software processes that may be initiated and invoked during interaction between developers and site tracking software 205.

The process for selecting sites for Web automation on behalf of portal subscribers may be aided in a number of ways. It is preferred that sites selected for automation be popular sites with many end-users. Therefore, a site may not be selected for automation unless a large number of end-users have repeatedly requested the site or, it is generally known in Internet community that the site in question enjoys a wide popularity. Automated sites may, in some embodiments, be presented to users in the form of a list of sites made available through a portal server 219. A user clicking on an icon asserting an address for such an automated site may, if desired, be automatically registered to or subscribed to the site and its services. Moreover, any services offered by a site may be accessed and manipulated on behalf of a requesting user without the user being required to visit the site.

In one embodiment, site selection for automation may be reserved for a specific group of high-level employees such as, perhaps, a marketing group. The decision to add a site may be based on a certain period of prior research into the site and its services. Furthermore, negotiation with companies hosting selected sites may, in some respects, have to be completed before a site may be added.

A new site request, illustrated herein as site request 221 enters a production queue 223 after it is confirmed that the site will be added. Production queue 223 may be a part of the function of server 201 of FIG. 9. Queue 223 contains all of the required parameters associated with all of the approved site requests. Such parameters are organized in the form of job orders in one embodiment, which are then sent to software 205. Software 205 accepts a job order for a new site addition and begins monitoring the specific web site for the purpose of gaining information that will aid in developing the automated routines used to enable access to the site by proxy. This function is illustrated herein by a monitoring and statistics gathering function 231 accompanied by a bi-directional communication arrow between software 205 in a plurality of Web servers 228, 229, and 230.

Web servers 228, 229, and 230 are analogous to Web servers 207 and 209 of FIG. 9. In this example, Web servers 228-230 are Web servers hosting Web sites selected for automation. A production database 200 is provided for keeping track of production status related to the process of automating a Web site. In order to fully automate a Web site, data about the target site must be obtained using function 231. For example, HTML data structure must be obtained for each site. The data paths and processes used to access services from a site must be mapped. It may also be desired to record other data during a monitoring period before any automated routines are written for providing proxy access to a site.

When enough data is obtained about a site by virtue of monitoring and statistics gathering function 231, the target site is assigned to developer 210 for production and future maintenance. In one embodiment of the present invention a developer may specialize in a certain type of sites. For example, one developer may be assigned to all sports-related sites. Another developer may be assigned to all news-related sites. Yet another developer may be assigned to all finance-related sites. In this way developers may specialize in developing and maintaining the kind of routines that work well with specific types of sites.

Software 205, in a preferred embodiment, utilizes special software modules (not shown) for obtaining specific types of data from a web site. Some of this data is, of course, required before routines may be written by developers to automate a site. Other types of data must be obtained through persistent site monitoring in order to inform developers when certain activity or status changes occur at a site wherein such changes may affect the functionality of automated access to the site. Because there are many categories of data that may be obtained from any single Web site, specialized reporting modules are used by software 205 for accessing and reporting specific types of data. Although such modules are not specifically illustrated in this embodiment, one with skill in the art will recognize the logical use and implementation of such modules from further description provided below.

A job order/status reporting module is provided within software 205 and adapted to generate a continually or frequently updated production report on the process of automating a particular web site. Such a report may be obtained through production database 200. In this way site developers, managers, and other individuals concerned with the process may view current status related to the production of sites-in-progress.

A compatibility assessment module is provided within software 205 and adapted to assess various technologies used in a web site and generate reports suggesting compatible technologies that may be used in providing successful automation to a site. For example, if a Web service uses Surround video technology and a selection technique for viewing and selecting items available for purchase, then an automated routine for accessing the service must incorporate an interface that understands that process. A compatibility assessment routine is completed, in a preferred embodiment, before any automated routines are written for a particular web site.

A content specification module is provided within software 205 and adapted to generate a report specifying the content available from a particular web site. This data would also be obtained before any automated routines are written for accessing services from the site. In one aspect, a determination of negative content made available for a site may cause such a site to be rejected for production and de-selected for automation.

Developer 210, through communication with software 205, may access all of the relevant data required to begin developing automated routines for accessing the site and performing services offered through the site. This is illustrated by a bi-directional communication arrow labeled communication illustrated between developer 210 software 205. In one embodiment, developer 210 may simply access an assignment sheet to view newly assigned job orders, and then access the relevant data about the sites from a connected data repository (DR 203 FIG. 9). In another embodiment, notifications may be sent to developer 210 when the sites are assigned and data is available to begin production.

Once developer 210 creates automated routines that will ultimately be used to access and perform services through a site on behalf of users, it is desired that the routines may be tested for functionality before actually being implemented as a functional and automated template that will be used by a navigation system at the site (debug). If automated routines were allowed to stand before being tested, they may fail in the field causing inconveniences for both the navigation system and for end-users. Therefore, a performance test module is provided within software 205 and adapted to emulate or model the software processes required for successful interaction with a site. A test module is created for and is specific to a particular site. Developer 210 may execute automated routines on the test module to see if they will succeed or fail. A test module may include a reporting feature for generating a failure report, which lists the point and cause of failure of and executed routine. Testing routines before actual implementation greatly increases the efficiency of a proxy navigation system as a whole.

After a site is successfully automated and ready for implementation, a link to the newly offered site is sent to portal server 219 as illustrated by a directional arrow emanating from software 205 to portal server 219 and labeled link to site added. A newly offered site may be presented in a list of sites made available through portal server 219 to portal-service subscribers (portal subscriber 217).

Continued monitoring of an added web site is performed by software 205 after a site is automated and made available to portal subscribers. In a preferred embodiment, specialized modules are used in this phase of monitoring as well. For example, a statistics module is provided within software 205 and adapted to obtain statistics related to ongoing instances of accessing the site on behalf of portal subscribers. Such statistics may include but are not limited to site performance statistics, instances of site access per given time period, percentage of services requested from the site, statistics related to continued popularity of the site, and so on.

A site history module is provided within software 205 and adapted to compile a history report related to content updates, address changes, added technologies, and other changes made to a particular site, some of which may directly affect success or failure and accessing the site and performing services at the site. It is intended, of course, that any immediate changes to a Web site are reported back to a developers charged with maintaining the site for automated access. However, compiling a history may also aid a developer in predicting when a site change may occur.

An error history module is provided within software 205 and adapted to compile an error history report detailing successes and failures of automated routines, which are logged in ongoing fashion as a site is routinely accessed and manipulated for services. Such a report can be studied by a developer to determine best ways for streamlining automated routines, and perhaps fine-tuning them for more efficient execution.

A bug reporting module is provided within software 205 and adapted to compile a list of open bugs still affecting a site. This report may be included in production database 200 so that production status may be obtained concerning the process of fixing or working around existing bugs in a particular web site. In this way, a third party may observe the progress of fine-tuning and maintaining automation of a web site after a site is added. If a particular web site is currently not fully automated because of bugs, which have occurred since automation, a developer charged to the site may be notified as a matter of priority, to escalate work on the effected site.

An error dump module is provided within software 205 and adapted to compile a detailed error report listing all of the errors have occurred with a particular site including all of the parameters connected to such errors. This report logs the type of error, the point of error, the cause of the error, and the system result of the error. Any personal information connected to the error such as user ID, credit card information, Social Security information, or any other personal information is automatically discarded before the error is entered into a dump file. In this way, errors may be researched in detail without releasing or compromising any user information.

In one embodiment of the present invention specialized modules as described above may in some instances be distributed within servers 228, 229, and 230 as self-contained modules adapted to report information back to software instance 205. In other embodiments, the specialized modules described above may be executed from within server 201 of FIG. 9. There are many possibilities. Breaking software 205 down into a plurality of specialized modules allows for independent and succinct reports and activity logs which are dedicated to revealing specific conditions and states related to tracked websites.

It will be apparent to one with skill in the art that the method and apparatus of the present invention provides an automated way to obtain virtually any type of information from a web site or hosting server. Furthermore, dividing the functionality of software 205 into a plurality of dedicated modules allows data to be quickly organized into usable format for access by developers. The method and apparatus of the present invention greatly enhances the production of web site developers in that they are not required to physically obtain the information through traditional methods. Moreover, efficiency in creating compatible routines for enabling automated access and site manipulation is greatly enhanced by providing developers with a wealth of information that is immediately accessible.

The inventor intends that the architecture, as well as the general process illustrated herein represent exemplary embodiments for practicing the present invention. There are many other embodiments wherein the method and apparatus of present invention may be practiced. The method and apparatus of the present invention may be practiced via private individuals on the Internet, businesses operating on a WAN connected to the Internet, businesses operating via private WAN, and so on. There are many customizable situations.

The present invention as taught herein and above should be afforded the broadest of scope. The spirit and scope of the present invention is limited only by the claims that follow.

What is claimed is:

1. An Internet proxy method provided by software executing from a computerized server connected to the Internet, comprising:

providing a subscriber with access to functions of the computerized server having one or more Internet interfaces for access by the portal service to individual web sites providing additional services;

associating the subscriber with one or more individual web sites providing additional services, including a selection mechanism enabling the subscriber to select a web site and request a service offered by that web site;

accessing the web site selected by the subscriber, on behalf of the subscriber, eliciting the service requested by the subscriber; and delivering the service to the subscriber.

2. The method of claim 1 wherein access on behalf of the subscriber includes logging in to the web site using a username and password provided in advance by the subscriber.

3. The method of claim 1 further comprising a function for the subscriber to request adding additional web sites to the association of web sites with the subscriber.

4. The method of claim 3 wherein, upon the subscriber requesting a new web site be added to the association, the new requested web site is accessed and data is gathered enabling a developer to prepare scripts enabling access to the new web site on behalf of the subscriber, and providing services for the subscriber by proxy from the new web site.

5. The method of claim 1 wherein failure of web site access on behalf of a subscriber, or failure of a service requested by the subscriber, is recorded.

6. The method of claim 5 including a step for providing the recorded failure to a web developer for repair of scripts for interaction with the web site for which an interaction failed.

* * * * *